(12) United States Patent
Kajita

(10) Patent No.: US 6,469,799 B1
(45) Date of Patent: Oct. 22, 2002

(54) IMAGE FORMING APPARATUS AND IMAGE FORMING METHOD

(75) Inventor: Koji Kajita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/457,310

(22) Filed: Dec. 9, 1999

(30) Foreign Application Priority Data

Dec. 11, 1998 (JP) .............................. 10-353566

(51) Int. Cl.⁷ ................................................. G06K 1/00
(52) U.S. Cl. ........................ 358/1.16; 358/448; 382/309
(58) Field of Search ............................... 358/1.16, 448, 358/404, 452, 444, 409; 382/309, 295

(56) References Cited

U.S. PATENT DOCUMENTS 5,526,128 A  *  6/1996  Fujiki et al. ................. 358/444

* cited by examiner

Primary Examiner—Mark Wallerson
Assistant Examiner—Twyler Lamb
(74) Attorney, Agent, or Firm—Fitzpatrick, Cella, Harper & Scinto

(57) ABSTRACT

Determination is made whether or not memory contents have been changed for each memory block. A physical memory corresponding to the memory block whose contents have not been changed is released as an area where no rendering data is stored. Then such area is managed distinguishably from other areas where rendering data are stored. As a result, memory areas are effectively utilized.

12 Claims, 6 Drawing Sheets

VPN = VIRTUAL PAGE NUMBER

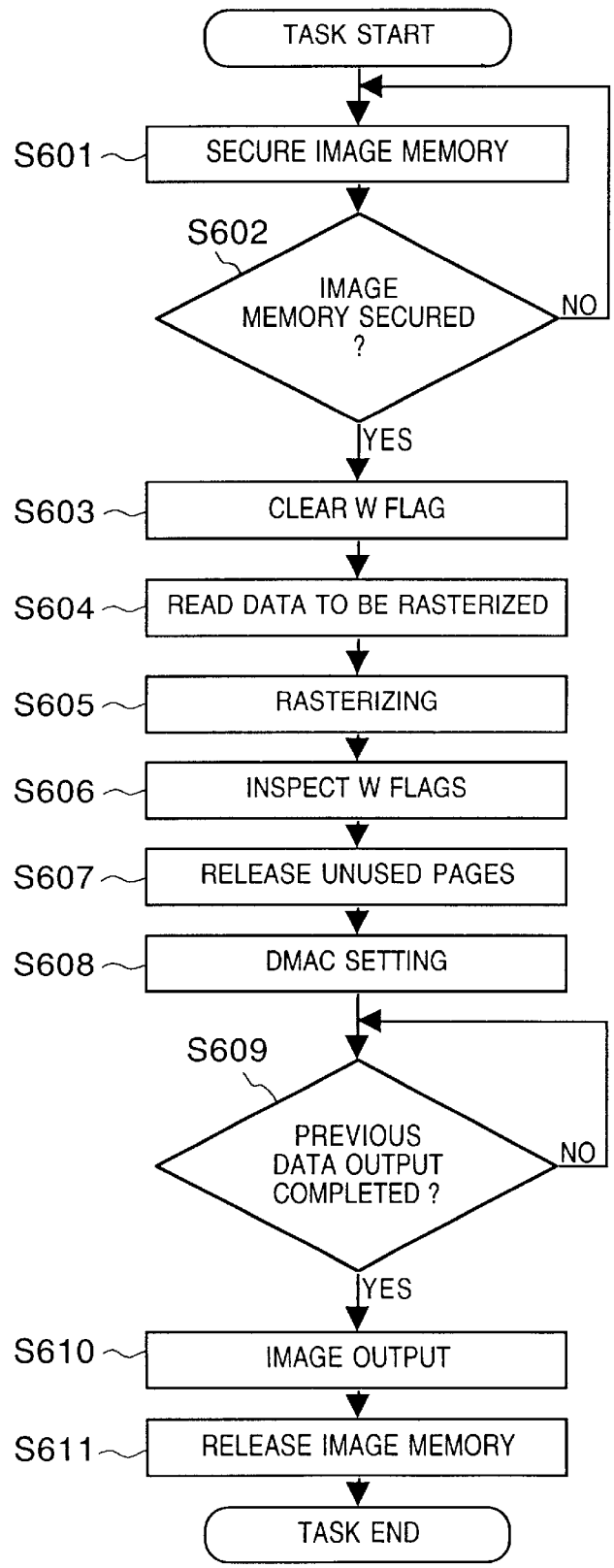

IMAGE FORMING APPARATUS AND IMAGE FORMING METHOD

BACKGROUND OF THE INVENTION

The present invention relates to an image forming apparatus, e.g., a laser-beam printer or the like, and image forming method for receiving data from a computer and performing printing on a medium, e.g., paper or the like, based on the received data.

Conventionally, a page printer, such as a laser-beam printer, employs an image formation method for supplying a printer with an image to be outputted which is expressed in a language independent of the printer resolution, and generating print data by a so-called rasterizing processing. Rasterizing processing is performed within the printer for converting the printer language into bitmap data corresponding to the resolution of the printer engine.

However, in the conventional rasterizing operation, it is necessary to store bitmap data, having a resolution corresponding to an output device, in a memory of the printer. Therefore, a memory area corresponding to the entire output page or a memory in a band unit corresponding to a part of the output page is necessary.

However, not all areas of an image to be outputted includes an object that needs rendering. Even in a case where output data mostly consists of blanks, the aforementioned memory area must be assigned. In view of this, efficient use of a memory area has been an issue that needs improvement.

SUMMARY OF THE INVENTION

The present invention is made in consideration of the above situation, and has as its object to provide an image forming apparatus and image forming method which can efficiently utilize a memory.

To achieve this object, the image forming apparatus and image forming method according to the present invention has the following configuration.

More specifically, the present invention provides an image forming apparatus for receiving inputted language describing an image to be outputted and generating a bitmap image for printing an image on a print medium, comprising: a physical memory for storing a program and data; a CPU for executing the program stored in the physical memory; a first address space for virtually storing data and a program executed when the CPU performs rasterizing operation; a second address space used for accessing the physical memory; address conversion means for performing mapping and management of address data from the first address space to the second address space in unit of a predetermined memory block; determination means for determining whether or not memory contents have been changed, in unit of the memory block managed by the address conversion means; and data supply means for supplying data, in place of the physical memory, when data is to be read out of the physical memory, wherein when an image is to be outputted, a physical memory corresponding to a memory block, whose contents have not been changed, is released according to a determination result of the determination means, and data generated by the data supply means is supplied when data is to be read out of the physical memory.

Furthermore, the present invention provides an image forming method of receiving inputted language describing an image to be outputted and generating a bitmap image for printing an image on a print medium, comprising: a step of storing a program and data in a physical memory; a step of causing a CPU to execute the program stored in the physical memory; a step of virtually storing in a first address space, data and a program executed when the CPU performs rasterizing operation; a step of accessing the physical memory by using a second address space; an address conversion step of performing mapping and management of address data from the first address space to the second address space in unit of a predetermined memory block; a determination step of determining whether or not memory contents have been changed, in unit of the memory block managed in the address conversion step; and a data supply step of supplying data, in place of the physical memory, when data is to be read out of the physical memory, wherein when an image is to be outputted, a physical memory corresponding to a memory block, whose contents have not been changed, is released according to a determination result of the determination step, and data generated at the data supply step is supplied when data is to be read out of the physical memory.

Moreover, according to an aspect of the present invention, the address conversion means extracts a corresponding page frame number from an associative memory based on a virtual page number stored in the first address space, and combines the extracted page frame number with offset data stored in the first address space to map address data to the second address space in unit of the memory block.

Moreover, according to an aspect of the present invention, the associative memory stores a virtual page number, page frame number, and flag information for identifying whether or not data contents have been changed.

Moreover, according to an aspect of the present invention, in the address conversion step, a corresponding page frame number is extracted from an associative memory based on a virtual page number stored in the first address space, and the extracted page frame number is combined with offset data stored in the first address space to map address data to the second address space in unit of the memory block.

Moreover, according to an aspect of the present invention, the associative memory stores a virtual page number, page frame number, and flag information for identifying whether or not data contents have been changed.

Moreover, according to an aspect of the present invention, the aforementioned image forming method further comprises the step of dividing an output image into a plurality of areas and rasterizing the plurality of areas when the CPU performs rasterizing operation.

Moreover, according to an aspect of the present invention, the aforementioned image forming apparatus further comprises: detection means for detecting same data or repetition of data when data is to be stored in the first address space; and storage means for storing a detection result of the same data or repetition of data in the address conversion means, wherein when an image is to be outputted, a physical memory corresponding to a memory block, having the same data or repetition of data, is released according to the detection result of the detection means, and data generated by the data supply means is supplied when data is to be read out of the physical memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a flowchart showing steps of print-out operation by the image forming apparatus according to the present invention.

DETAILED DESCRIPTION OF THE PREFERRED EMBODIMENTS

Preferred embodiments of the present invention will be described in detail in accordance with the accompanying drawings.

<First Embodiment>

Figure 1:
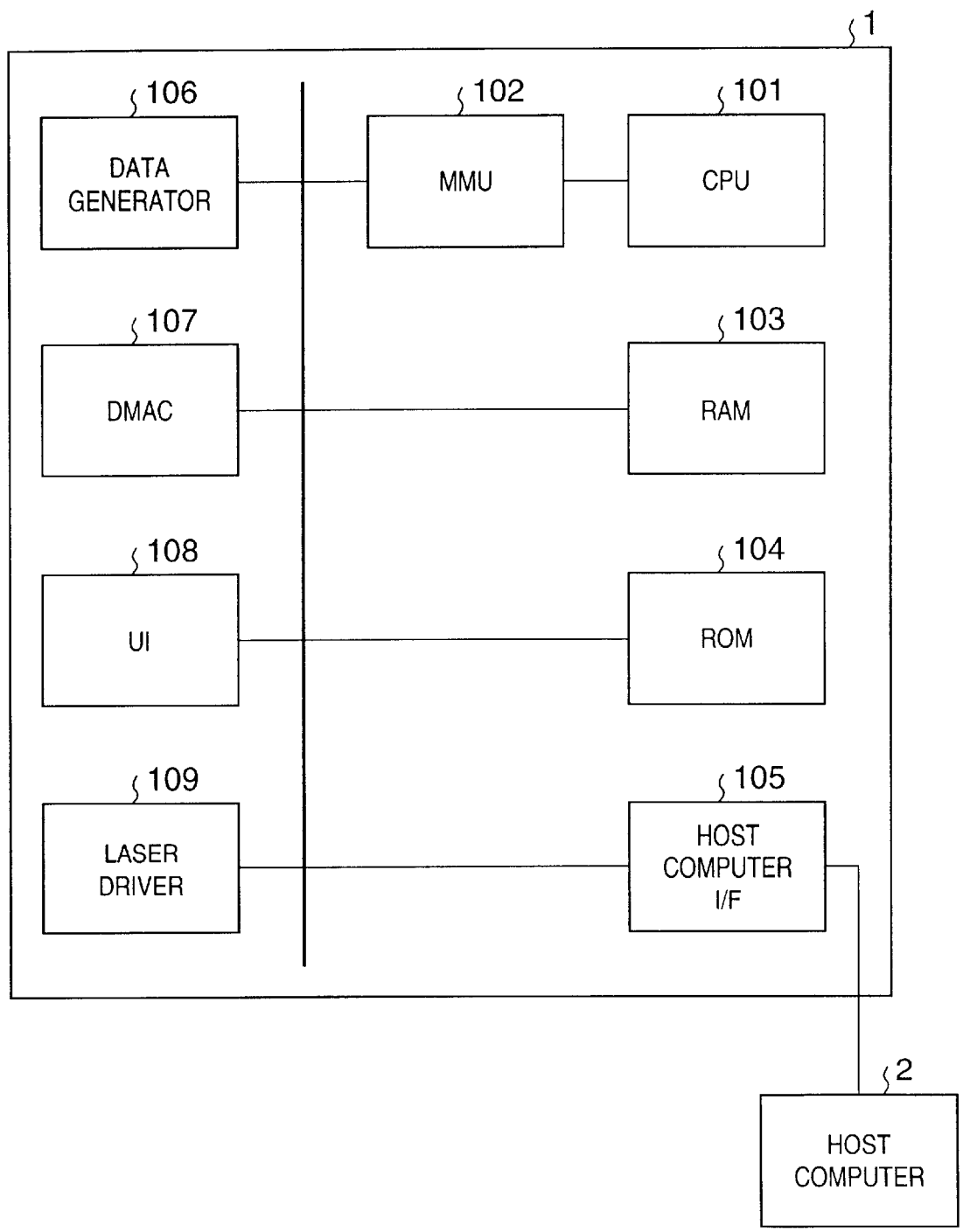
FIG. 1 is a block diagram showing an image generation circuit of an image forming apparatus according to the present invention.

FIG. 1 is a block diagram showing a printer construction according to the first embodiment of the present invention. In FIG. 1, reference numeral 1 denotes a printer main body; and 2, a host computer connected to the printer. The printer 1 is configured with a CPU 101, a memory management unit (MMU) 102, RAM 103, ROM 104, a host computer interface 105, a data generator 106, a DMA controller 107, an operation panel interface 108, and a laser driver 109.

The CPU 101 controls respective units of the printer, and generates image data to be printed in accordance with instructions transmitted by the host computer 2. The MMU 102 performs address conversion from a virtual memory address, used by the CPU for program execution, to a physical address where a physical memory exists. The RAM 103 is a random access memory which holds data such as programs or variables for operation of the CPU 101, and holds image data of an image to be printed. The ROM 104 is a non-volatile memory which holds programs executed by the CPU 101 and other font data.

The host computer interface 105 communicates with the host computer 2. The first embodiment employs a Centronics-compatible interface, capable of bi-directional communication and having a function to receive commands for printing or return printer status information to the host computer 2. The data generator 106 generates print data, instead of the DMA controller reading data from the RAM 103, when an image is to be printed. The DMA controller 107 transfers data. more specifically, the DMA controller 107 reads data out of the RAM 103 according to the setting of the CPU 101, or reads data out of the data generator 106, and transfers the read data to the laser driver 109. The operation panel interface 108 performs various setting of the printer, and drives an operation panel for informing a user of a printer status. The laser driver 109 drives a laser diode (not shown) in accordance with data transmitted by the DMA controller 107.

The printer 1 comprises an laser printer engine (not shown) and the laser printer engine prints an image by using the laser beam emitted from the laser diode.

Figure 2:
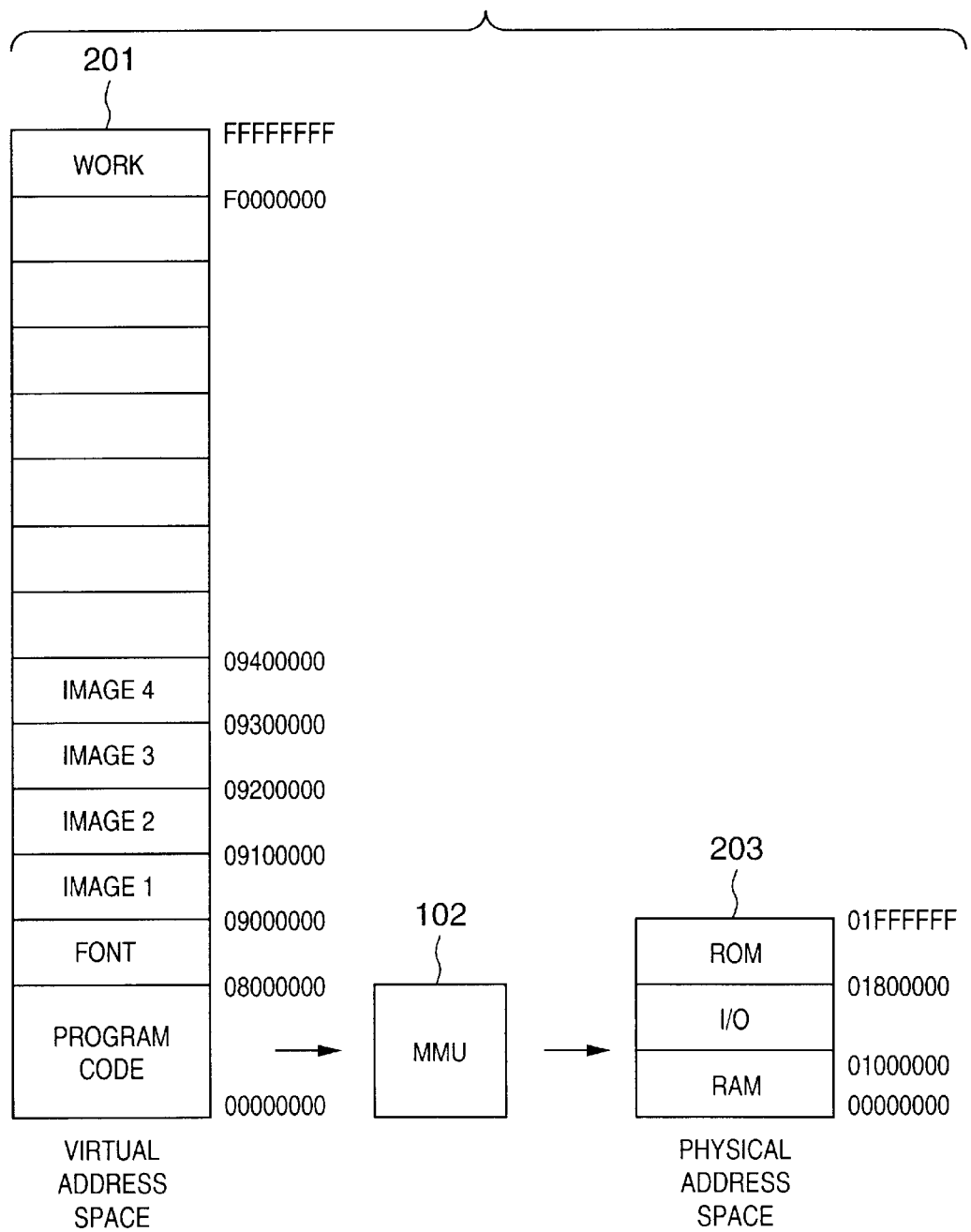
FIG. 2 is a view for explaining the relationship between a virtual address space and physical address space in the image forming apparatus according to the present invention.

FIG. 2 is a view for explaining the relationship of a memory space in the printer. Referring to FIG. 2, reference numeral 201 denotes a virtual address space used when a program operates. The virtual address space includes areas for program codes or font data, work areas, and image data areas for storing bitmap data. The MMU 102 performs mapping of these virtual address areas to physical memory areas. By this, the CPU can access the physical address space 203 where physical memory exists. Hereinafter, processing in the image data areas particularly related to the present invention is described.

Figure 3:
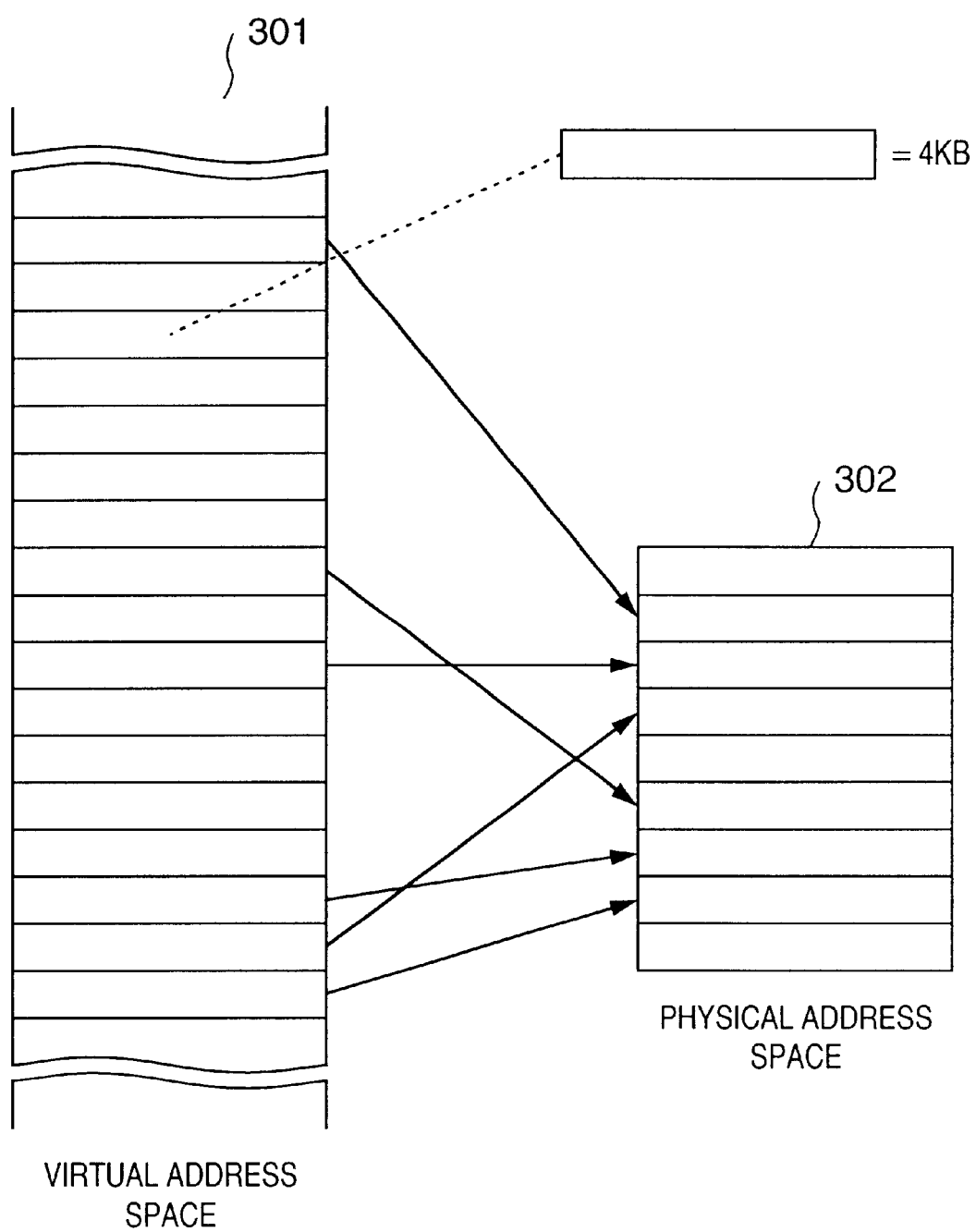
FIG. 3 shows memory allocation between a virtual address space and physical address space in the image forming apparatus according to the present invention.

FIG. 3 is an enlarged schematic view of mapping in the image data areas. A virtual address space 301 includes consecutive memory areas, which are divided in pages of 4 KB block unit. In the actually allocated physical memory, non-consecutive page areas may be allocated as exemplified by reference numeral 302.

Figure 4:
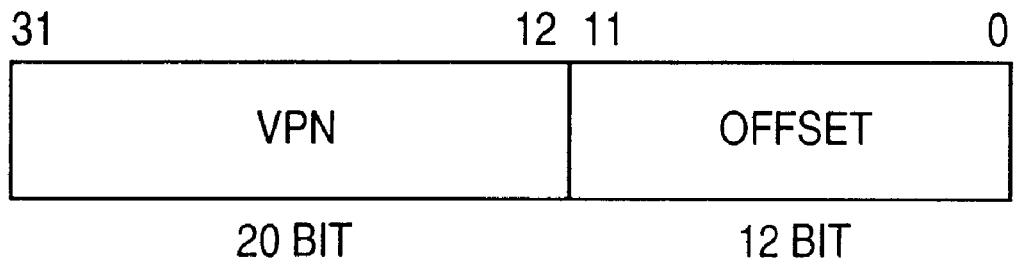
FIG. 4 is an explanatory view of a virtual address structure according to the present invention.

FIG. 4 is an explanatory view of a virtual address structure. The CPU 101 has a 32-bit address. A virtual address consists of lower-order 12 bits allocated for an offset address (OFFSET) and higher-order 20 bits allocated for a virtual page number (VPN). The higher-order VPN is converted to a physical address by the MMU 102. The lower-order OFFSET is used as a physical address, thus, 4 KB are allocated to a physical address, in unit of 12-bit blocks.

Figure 5:
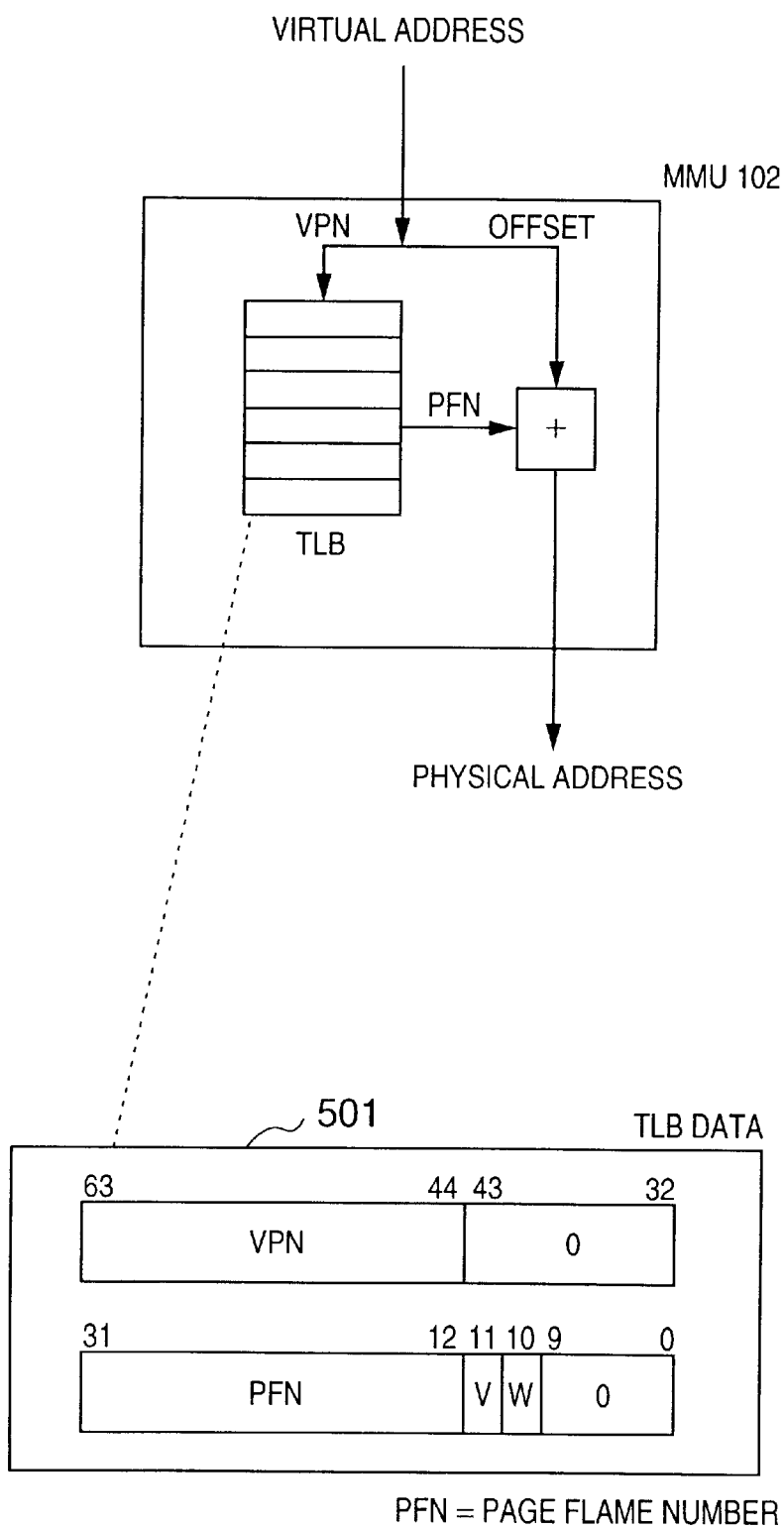
FIG. 5 is an explanatory view showing a structure of a memory management unit (MMU) and a data structure in a TLB of the image forming apparatus according to the present invention.

FIG. 5 is an explanatory view showing a structure of the MMU 102 and a data structure in a translation lookaside buffer (TLB). By utilizing an associative memory TLB provided for 64 entries, a physical address corresponding to a virtual address can be generated. The MMU 102 accesses TLB, storing the virtual page number (VPN) for the higher-order 20 bits of a virtual address, and acquires the page frame number (PFN) held therein.

The acquired PFN is combined with the OFFSET of the original virtual address, thereby converted to a physical address, and outputted.

Reference numeral 501 in FIG. 5 shows a data structure for one entry of the associative memory (TLB) included in the MMU 102. The data structure for one entry having 64 bits consists of a virtual page number (VPN) of the virtual address, a page frame number (PFN) indicative of a physical address corresponding to the virtual address, and flag bits (V and W) each indicating a page status. When the CPU 101 accesses an address in the virtual address space, data is searched from data entries stored in the associative memory (TLB) having an address corresponding to the virtual page number (VPN) of the virtual address, and then the corresponding PFN value is obtained.

The MMU 102 combines the OFFSET with the PFN indicative of a physical address corresponding to the virtual page number (VPN), thereby obtaining an address in the physical memory.

The data structure in the TLB includes two flags V and W. V indicates that an entry is set in an effective page; and W is set when data is written in the effective page.

Note that when the CPU 101 refers to the TLB, if a page corresponding to the virtual address cannot be found in the data stored in the entries of the TLB, the MMU 102 informs the CPU of the occurrence of an exception. The CPU 101 then executes a memory management program in an exception processing, thereby updating the TLB entries.

In the exception processing, contents of entries which are not often used in the TLB entries are written back to a memory management table, and data corresponding to the virtual address is then written in the TLB entry.

FIG. 6 is a flowchart showing characteristic operation of a printer, as an example of an image forming apparatus, according to the present invention. FIG. 6 explains a task implemented by the printer, which executes rasterizing of bitmap data for one screen and outputting an image. The task is generated for each output page. A plurality of rasterizing tasks are executed in parallel. Besides the rasterizing tasks, other tasks are also implemented in parallel, e.g., a task for receiving data by communicating with a host computer, a task as a pre-processing of rasterizing for translating data into a page description language so as to generate intermediate data and registering the data to a queue in page unit, and so forth.

Prior to rasterizing, an image memory area is allocated in step S601 for storing rasterized bitmap data. More specifically, in step S601, a required memory capacity is requested to a virtual memory management program. The virtual memory management program then determines an available physical memory block and allocates consecutive memory areas in the virtual address space. The virtual memory management program also associates respective blocks with physical memory areas, updates the memory management table, and allocates the memory areas in the virtual address space as well as the physical memory areas. The allocated memory areas are simultaneously cleared to 0, thereby initialized to express a white blank.

In step S602, it is determined whether or not a memory area is allocated. If a memory area is not allocated (NO in S602), the control returns to step S601 and loops until a memory area necessary for the task is released by other tasks and allocated.

If a memory area is allocated (YES in S602), the control proceeds to step S603 where the W flag for the associative memory (TLB) data corresponding to the allocated physical memory and the W flag in the corresponding memory management table are initialized to 0.

In step S604, data to be rasterized is read from a data queue. The data stored in the data queue has been translated by a pre-processing program, in advance, from the data in a page description language transmitted by a host computer.

In step S605, bitmap data for an image is rendered in accordance with the read data, and outputted to the image memory area allocated in step S601. At this step, when data is written in a virtual address allocated for a physical address, the MMU 102 changes the W flag bit for this data to 1 in the TLB table. Therefore, once data is written in the physical address, 1 is set to the W flag for the TLB data of the corresponding block and to the W flag of a corresponding memory management table.

When rendering of bitmap data to be outputted is completed, all the W flags for the TLB data in the image memory areas and W flags in the memory management table are inspected in step S606. Then, blocks whose flag is still set to 0 ever since initialization in step S603, are listed.

In step S607, the physical memory allocation to the listed memory space is released so as to make the memory space available for other programs.

In step S608, the DMA controller 107 is set for outputting the rendered bitmap data. In order to output data consecutively arranged in the virtual address space, association between the virtual address space and the physical address space is made in advance by the CPU, and DMA operation (data generation) is performed by using a DMA table for data generation, in which the page order of the physical memory is prepared in advance.

The DMA table is set so that an address for the data generated by the data generator 106 is mapped as a physical address to an address allocated to the aforementioned released memory. By this, the DMA controller 107 reads 0 (white data), generated by the data generator 106, instead of reading the released memory, and transfers it to the laser driver 109. Accordingly, the same image data as that obtained in a case a memory is not released, can be transferred to the laser driver, while providing data generated by the generator 106.

In step S610, the laser diode is driven, a latent image of an output image is formed on a photosensitive drum, and an image is printed on a print medium based on the latent image. When the image output is completed, the remaining pages in the allocated image memory are released in step S611, and data is removed from the memory management table, thereby making the memory areas available for other tasks. Then, the rasterizing task ends.

In the foregoing manner, rasterizing operation is performed and an image is printed.

<Second Embodiment>

In the first embodiment, the memory page, which has been once allocated but no data has been written, is released. A similar processing as that of the first embodiment can be applied in a case where each page contains uniform data. For instance, assuming a case of writing data in a memory, a mechanism for checking contents of data to be written may be provided to detect the same data or repeated data in all pages of a virtual address. If the same data or repeated data is detected, such information is added to the TLB data structure. By this, physical memory corresponding to the memory areas can be released prior to performing image output.

Furthermore, the second embodiment is described based on an assumption that a memory for forming an entire output image is allocated. However, in a case of dividing an output image into plural band areas and performing rasterizing, the present invention is applicable in the band unit.

<Other Embodiments>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus, reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been set forth above, according to the present invention, contents of a physical memory corresponding to a virtual address space is substituted by another data generated by data generator. By virtue of this, the memory block can be released, making it possible to use the physical memory efficiently.

The present invention is not limited to the above embodiments and various changes and modifications can be made within the spirit and scope of the present invention. Therefore, to apprise the public of the scope of the present invention, the following claims are made.

What is claimed is:

1. An image forming apparatus for receiving inputted language describing an image to be outputted and generating a bitmap image for printing an image on a print medium, comprising:
   a physical memory for storing a program and data;
   a CPU for executing the program stored in the physical memory;
   a first address space for virtually storing data and a program executed when said CPU performs rasterizing operation;
   a second address space used for accessing said physical memory;
   address conversion means for performing mapping and management of address data from said first address space to said second address space in unit of a predetermined memory block;
   determination means for determining whether or not memory contents have been changed, in unit of the memory block managed by said address conversion means; and
   data supply means for supplying data, in place of said physical memory, when data is to be read out of said physical memory,
   wherein when an image is to be outputted, a physical memory corresponding to a memory block, whose contents have not been changed, is released according to a determination result of said determination means, and data generated by said data supply means is supplied when data is to be read out of said physical memory.

2. The image forming apparatus according to claim 1, wherein said address conversion means extracts a corresponding page frame number from an associative memory based on a virtual page number stored in said first address space, and combines the extracted page frame number with offset data stored in said first address space to map address data to said second address space in unit of the memory block.

3. The image forming apparatus according to claim 2, wherein the associative memory stores a virtual page number, page frame number, and flag information for identifying whether or not data contents have been changed.

4. The image forming apparatus according to claim 1, further comprising a laser printer engine.

5. The image forming apparatus according to claim 1, further comprising:
   detection means for detecting same data or repetition of data when data is to be stored in said first address space; and
   storage means for storing a detection result of the same data or repetition of data in said address conversion means,
   wherein when an image is to be outputted, a physical memory corresponding to a memory block, having the same data or repetition of data, is released according to the detection result of said detection means, and data generated by said data supply means is supplied when data is to be read out of said physical memory.

6. An image forming method of receiving inputted language describing an image to be outputted and generating a bitmap image for printing an image on a print medium, comprising:
   a step of storing a program and data in a physical memory;
   a step of causing a CPU to execute the program stored in the physical memory;
   a step of virtually storing in a first address space, data and a program executed when the CPU performs rasterizing operation;
   a step of accessing the physical memory by using a second address space;
   an address conversion step of performing mapping and management of address data from the first address space to the second address space in unit of a predetermined memory block;
   a determination step of determining whether or not memory contents have been changed, in unit of the memory block managed in said address conversion step; and
   a data supply step of supplying data, in place of the physical memory, when data is to be read out of the physical memory,
   wherein when an image is to be outputted, a physical memory corresponding to a memory block, whose contents have not been changed, is released according to a determination result of said determination step, and data generated at said data supply step is supplied when data is to be read out of the physical memory.

7. The image forming method according to claim 6, wherein in said address conversion step, a corresponding page frame number is extracted from an associative memory based on a virtual page number stored in the first address space, and the extracted page frame number is combined with offset data stored in the first address space to map address data to said second address space in unit of the memory block.

8. The image forming method according to claim 7, wherein the associative memory stores a virtual page number, page frame number, and flag information for identifying whether or not data contents have been changed.

9. The image forming method according to claim 6, further comprising the step of dividing an output image into a plurality of areas and rasterizing the plurality of areas when the CPU performs rasterizing operation.

10. The image forming method according to claim 6, further comprising the steps of:
    a step of detecting same data or repetition of data when data is to be stored in said first address space; and
    a step of storing a detection result of the same data or repetition of data in said address conversion step,
    wherein when an image is to be outputted, a physical memory corresponding to a memory block, having the same data or repetition of data, is released according to the detection result of said step of detecting, and data generated by said data supply step is supplied when data is to be read out of said physical memory.

11. An image processing apparatus comprising:
    means for receiving first data specifying an image to be outputted;

means for converting the first data into second data, said converting means generates a first address for storing the converted second data into memory means;

address conversion means for converting said first address to second address;

determination means for determining whether or not memory contents have been changed, in unit of a memory block; and data generating means for generating third data, wherein said determination means determines whether or not the memory contents have been changed, when the memory contents have been changed, the second data are read out from said memory means and are supplied for outputting the image, when the memory contents have not been changed, the third data are generated by said data generating means and are supplied for outputting the image.

12. An image processing apparatus comprising:

means for receiving first data specifying an image to be outputted;

means for converting the first data into second data, said converting means generates a first address for storing the converted second data into memory means;

address conversion means for converting said first address to second address;

detection means for detecting repetition of same data in said second data;

storage means for storing a detection result of the repetition of the same data in said address conversion means; and data generating means for generating the same data, wherein when repetition of the same data is detected by said detection means, the same data which is generated by said data generating means is supplied for processing the image data, when repetition of the same data is not detected by said detection means, the second data is read out from said memory means, and is supplied for processing the image data.

* * * * *

UNITED STATES PATENT AND TRADEMARK OFFICE
CERTIFICATE OF CORRECTION

PATENT NO.   : 6,469,799 B1
DATED        : October 22, 2000
INVENTOR(S)  : Kajita It is certified that error appears in the above-identified patent and that said Letters Patent is hereby corrected as shown below:

Drawings:
Sheet 5 of 6, FIG. 5, "FLAME" should read -- FRAME --.

Column 1,
Line 26, "includes" should read -- include --.

Column 3,
Line 56, "more" should read -- More --; and
Line 65, "an" should read -- a --.

Column 6,
Line 55, "are" should read -- being --.

Signed and Sealed this

Twenty-second Day of April, 2003

JAMES E. ROGAN
*Director of the United States Patent and Trademark Office*